US011288595B2

(12) United States Patent
Ross et al.

(10) Patent No.: US 11,288,595 B2
(45) Date of Patent: Mar. 29, 2022

(54) MINIMIZING MEMORY AND PROCESSOR CONSUMPTION IN CREATING MACHINE LEARNING MODELS

(71) Applicant: Groq, Inc., Menlo Park, CA (US)

(72) Inventors: Jonathan Alexander Ross, Palo Alto, CA (US); Douglas Wightman, Palo Alto, CA (US)

(73) Assignee: Groq, Inc., Mountain View, CA (US)

( * ) Notice: Subject to any disclaimer, the term of this patent is extended or adjusted under 35 U.S.C. 154(b) by 1082 days.

(21) Appl. No.: 15/895,618

(22) Filed: Feb. 13, 2018

(65) Prior Publication Data
US 2018/0232663 A1    Aug. 16, 2018

Related U.S. Application Data

(60) Provisional application No. 62/458,754, filed on Feb. 14, 2017.

(51) Int. Cl.
*G06N 20/00* (2019.01)
*G06N 3/08* (2006.01)
*G06N 3/04* (2006.01)
*G06N 3/10* (2006.01)

(52) U.S. Cl.
CPC ........... *G06N 20/00* (2019.01); *G06N 3/0454* (2013.01); *G06N 3/08* (2013.01); *G06N 3/105* (2013.01)

(58) Field of Classification Search
CPC ........ G06N 20/00; G06N 3/0454; G06N 3/08; G06N 3/105
See application file for complete search history.

(56) References Cited

U.S. PATENT DOCUMENTS

| 5,657,255 | A | * | 8/1997 | Fink | .................. C07K 1/00 |
| 8,370,280 | B1 | * | 2/2013 | Lin | .................. G06N 20/00 |
| | | | | | 706/12 |
| 9,704,054 | B1 | * | 7/2017 | Tappen | .................. G06K 9/46 |
| 2014/0180738 | A1 | * | 6/2014 | Phillipps | .............. G06N 99/005 |
| 2015/0058331 | A1 | * | 2/2015 | Kulkarni | .............. G06F 17/3053 |
| 2016/0267396 | A1 | * | 9/2016 | Gray | .................. G06N 20/00 |
| 2018/0253645 | A1 | * | 9/2018 | Burr | .................. G06N 3/08 |
| 2019/0102675 | A1 | * | 4/2019 | Biswas | .................. G06N 3/00 |

(Continued)

OTHER PUBLICATIONS

Instant Learning: Parallel Deep Neural Networks and Convolutional Bootstrapping, Simpson May 2016 (Year: 2016).*

(Continued)

*Primary Examiner* — Vincent Gonzales
(74) *Attorney, Agent, or Firm* — Fenwick & West LLP

(57) ABSTRACT

The system presented here can create a new machine learning model by improving and combining existing machine learning models in a modular way. By combining existing machine learning models, the system can avoid the step of training a new machine model. Further, by combining existing machine models in a modular way, the system can selectively train only a module, i.e. a part, of the new machine learning model. Using the disclosed system, the expensive steps of gathering 8 TB of data and using the data to train the new machine learning model over 16,000 processors for three days can be entirely avoided, or can be reduced by a half, a third, etc. depending on the size of the module requiring training.

25 Claims, 13 Drawing Sheets

(56) References Cited

U.S. PATENT DOCUMENTS

2020/0202171 A1* 6/2020 Hughes ................ G06K 9/6265

OTHER PUBLICATIONS

Efficient Processing of Deep Neural Networks: A Tutorial and Survey, herein Sze Aug. 2017 (Year: 2017).*
Shen Q, Diao R, Su P. Feature Selection Ensemble. Turing-100. Jun. 22, 2012; 10:289-306. (Year: 2012).*
Le, Quoc V. "Building high-level features using large scale unsupervised learning." 2013 IEEE international conference on acoustics, speech and signal processing. IEEE, 2013. (Year: 2013).*

* cited by examiner

MINIMIZING MEMORY AND PROCESSOR CONSUMPTION IN CREATING MACHINE LEARNING MODELS

CROSS REFERENCE TO RELATED APPLICATIONS

This application claims the benefit of U.S. Patent Application No. 62/458,754 filed on Feb. 14, 2017, the contents of which are incorporated by reference in their entirety.

TECHNICAL FIELD

The present application is related to machine learning, and more specifically to methods and systems that minimize memory and processor consumption in creating machine learning models.

BACKGROUND

A machine learning model receives an input, such as a video, an audio, an alphanumeric text, etc., and produces an output label such as "cat", "man", "car" with various accuracies. To produce the machine learning model that reliably identifies the output label, the machine learning model must be trained on a large amount of input data. The trained machine learning model then receives new input data and makes an inference whether the new input data contains the output label.

Creating a machine learning model today requires a large amount of computational resources, such as processor cycles and memory. The seminal paper on machine learning from Google states that "[t]he model was trained in a distributed fashion on a cluster with 1,000 machines (16,000 cores) for three days." ("Building High-level Features Using Large Scale Unsupervised Learning"). The data needed to train the machine learning model is also large. According to the paper from Google "the dataset has 10 million 200×200 pixel images." (Id.). The size of the data set translates to 8 Terabytes (TB) of data.

SUMMARY

One or more embodiments of the present disclosure may include a system that creates a new machine learning model by improving and combining existing machine learning models in a modular way. By combining existing machine learning models, the system can avoid the step of training a new machine model. Further, by combining existing machine models in a modular way, the system can selectively train only a module, i.e. a part, of the new machine learning model. Using the disclosed system, the expensive steps of gathering 8 TB of data and using the large data set to train the new machine learning model on over 16,000 processors for three days can be entirely avoided, or can be reduced by a half, a third, etc. depending on the size of the module requiring training.

One or more embodiments of the present disclosure may include a system that gathers machine learning models from various sources, including at least one unreliable source. The machine learning models are identified by the input format that they receive, and an output label that they identify from the input format. For example, a machine learning model can take video as input format and produce an output label "chair".

A user of the system can request the system to provide the user with a machine learning model to identify "chair" to within a predefined accuracy level, from video input data. The predefined accuracy level can be user-specified, or automatically determined. The system then finds the machine learning models associated with the output label "chair". If none of the retrieved machine learning models identify "chair" to within the predefined accuracy level, the system can improve the accuracy of the machine learning model by combining the existing machine learning models in serial, in parallel, or hierarchically, to create a resulting machine learning model. Further, after combining the existing machine learning models, the system can train each of the constituent machine learning model separately, thus reducing the memory and processor requirements needed to train the resulting machine learning model.

BRIEF DESCRIPTION OF THE DRAWINGS

These and other objects, features and characteristics of the present embodiments will become more apparent to those skilled in the art from a study of the following detailed description in conjunction with the appended claims and drawings, all of which form a part of this specification. While the accompanying drawings include illustrations of various embodiments, the drawings are not intended to limit the claimed subject matter.

DETAILED DESCRIPTION

Terminology

Figure 1:
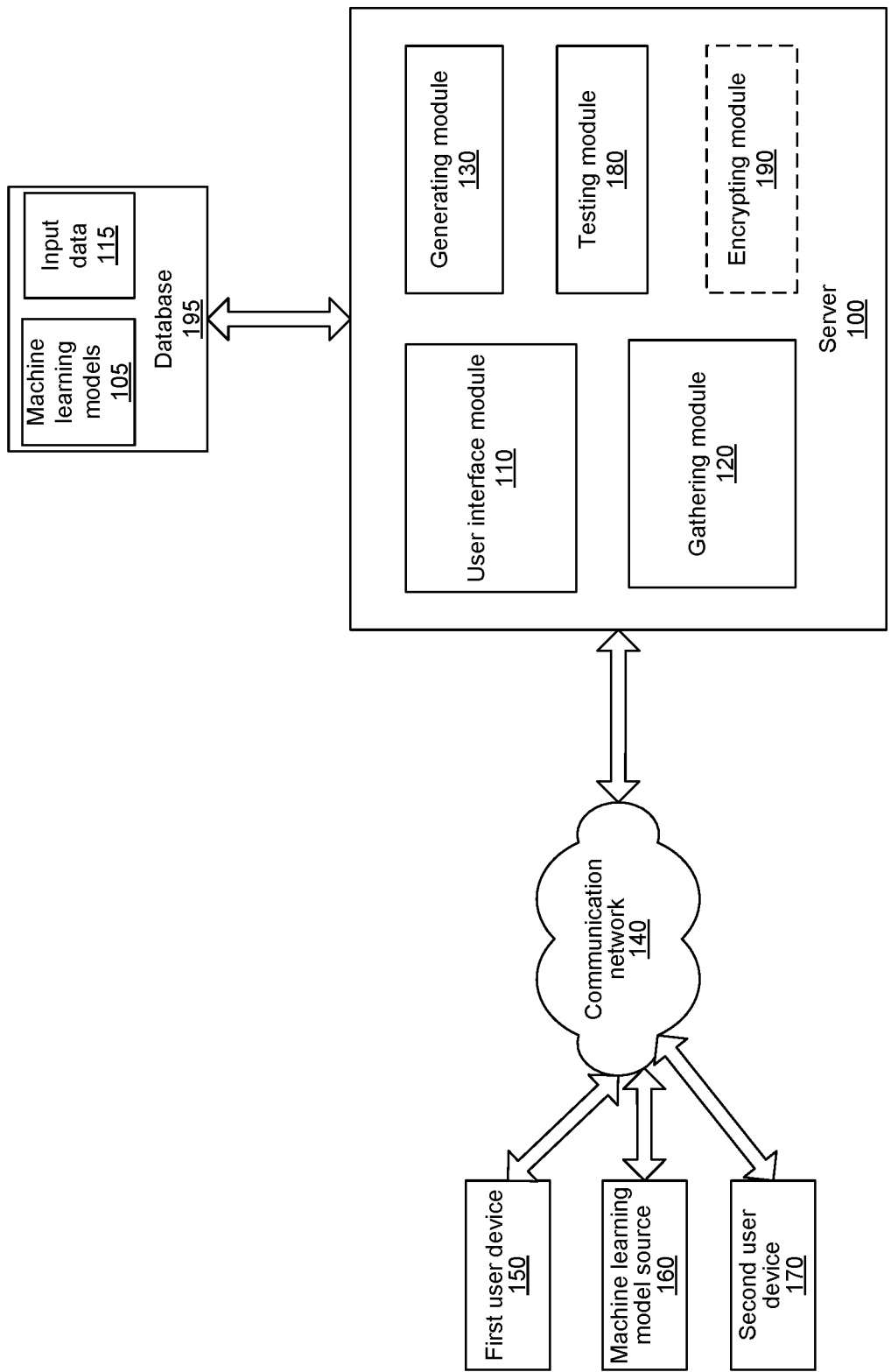
FIG. 1 is system including an apparatus to provide a machine learning model to a user based on user-specified criteria.

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Creating a Machine Learning Model

One or more embodiments of the system presented herein can create a new machine learning model by improving and combining existing machine learning models in a modular way. By combining existing machine learning models, the system can avoid the step of training a new machine model. Further, by combining existing machine models in a modular way, the system can selectively train only a module, i.e. a part, of the new machine learning model. Using the disclosed system, the expensive steps of gathering 8 TB of data and using the large data set to train the new machine learning model over 16,000 processors over three days can be entirely avoided, or can be reduced by a half, a third, etc. depending on the size of the module requiring training.

The amount of the resource savings can depend super linearly on the size of the module requiring training. For example, assume the module requiring training is half of the total size of the combined machine learning model. The amount of computational resources saved in training only half of the combined machine learning model is more than half of the resources required to train the full combined machine learning model. Thus, if training the full combined machine learning model takes 8 TB of data and 16,000 processor over 3 days, training half of the machine learning model would take less than 4 TB of data, and 8000 processors over 3 days.

The system presented here can gather machine learning models from various sources, including at least one unreliable source. The machine learning models are identified by the input format that they receive, and an output label that they identify from the input format. For example, a machine learning model can take video as input format and produce an output label "chair".

A user of the system can request the system to provide the user with a machine learning model to identify "chair" to within a predefined accuracy level, from video input data. The predefined accuracy level can be user-specified, or automatically determined. The system then finds the machine learning models associated with the output label "chair". If none of the retrieved machine learning models identify "chair" to within the predefined accuracy level, the system can improve the accuracy of the machine learning model by combining the existing machine learning models in serial, in parallel, or hierarchically, to create a resulting machine learning model. Further, even after combining the existing machine learning models, the system can train each of the constituent machine learning model separately, thus reducing the memory and processor requirements needed to train the resulting machine learning model. The resulting machine learning model can be encrypted before being sent to the user.

FIG. 1 is system including an apparatus to provide a machine learning model to a user based on user-specified criteria. The apparatus includes a server 100, and a database 195. The database 195 includes machine learning models 105, and input data 115 used to train and test the machine learning models 105.

The server 100 includes a user interface module 110, a gathering module 120, a generating module 130, a testing module 180, and an optional encrypting module 190. The server 100 can include one or more computing devices, such as servers, personal computers mobile devices, etc. The server 100 can be part of a cloud. The server 100 communicates with various other computing devices such as user devices, other servers, and/or databases over a communication network 140. The communication network 140 can be any communication network, such as the Internet, a cellular data network, a local area network, a mesh network, etc. The communication network 140 can be wired or wireless.

The user interface module 110, the gathering module 120, the generating module 130, the testing module 180, and the encrypting module 190 can be implemented in the form of instructions performed on one or more processors associated with the server 100. Further, one or more of the user interface module 110, the gathering module 120, the generating module 130, the testing module 180, and the encrypting module 190 can be implemented in hardware associated with the server 100.

The user interface module 110 receives from a first user device 150 a label describing a feature to identify within an input data. The input data can be video, audio, alphanumeric data, any combination of the foregoing, etc. The label can be a word such as "person", "stop sign", "car", "barking sound", etc.

The gathering module 120 obtains from one or more sources 160, including at least one unreliable source, one or more learning models trained to identify the label. The gathering module 120 stores the received machine learning models in the database 195. In addition, the gathering module 120 can obtain from various sources input data used in training and testing the machine learning models. Further, the gathering module 120 can store the received input data in the database 195.

An unreliable source can supply a machine learning model that requires further testing and improvement in accuracy before the machine learning model can be provided to the user. Accuracy of a machine learning model includes precision, and recall. Precision (also called positive predictive value) is the fraction of retrieved instances that are relevant, while recall (also known as sensitivity) is the fraction of relevant instances that are retrieved. Both precision and recall are based on an understanding and measure of relevance. For example, suppose a machine learning model for recognizing dogs in a video identifies seven dogs in a video containing nine dogs and some cats. If four of the identifications are correct, but three are actually cats, the program's precision is 4/7 while the program's recall is 4/9.

The generating module 130 creates the resulting machine learning model to identify the label from the input data within a predefined accuracy based on the one or more machine learning models trained to identify the label from the input data. The generating module 130 can improve the accuracy of a received machine learning model by providing additional training data to the machine learning model, or by modifying the machine learning model. The modification of the machine learning model can include combining the machine learning model with other machine learning models in various ways, such as in parallel, in serial, hierarchically, etc. Once the machine learning model has been modified, the modified machine learning model can be further trained to improve the accuracy. Alternatively, the server can train each of the constituent machine learning models separately, thus reducing the memory and processor requirements needed to train the machine learning model.

The generating module 130 can receive the predefined accuracy from the user, or can automatically determine the predefined accuracy. The generating module 130 can automatically determine the accuracy based on various factors, such as how safety critical the machine learning model is. For example, if the machine learning model identifies pedestrians in a self-driving car, the machine learning model is safety critical, and the accuracy has to be high. For the self-driving car, the recall needs to be high, for example 100%, because all the pedestrians need to be identified, while precision does not necessarily have to be as high, because slowing down the car by identifying objects that are not pedestrians as pedestrians is not of high importance. Consequently, the precision can be set at, for example, 90%. However, if the self-driving car is an ambulance, misidentifying statues as pedestrians would slow down the ambulance, impacting the ambulance's performance. In that case, the precision also needs to be high and set at, for example 99%.

The encrypting module 190 encrypts the resulting machine model. The machine model can be defined by the number of neurons, the connectivity between the neurons, and the weights associated with the neuron connections. The encrypting module 190 encrypts information associated with the machine learning model before sending the machine learning model to the user interface module 110 for delivery to the second user device 170, or before delivering the machine learning model directly to the second user device 170.

The user interface module 110 provides to a second user device 170 the resulting machine learning model to identify the label from the input data within a predefined accuracy. The second user device 170 can be the same as the first user device 150.

The testing module 180 can test the accuracy of a machine learning model, can determine the output label associated with the machine learning model, or both. To test the accuracy of the machine learning model, the testing module 180 provides input data containing the feature denoted by the output label of the machine learning model, such as "stop sign." The testing module 180 measures the accuracy of the objects detected as stop signs by the machine learning model. For example, testing module 180 provides various videos containing street stop signs, hand-held stop signs, stop signs in foreign languages, etc. to the machine learning model. The testing module 180 then determines the precision and recall of the objects identified as stop signs by the machine learning model. The testing module 180 can combine the precision and recall into a single accuracy metric. For example, when precision is 60% and recall is 70%, the accuracy is 65%. Alternatively, the testing module 180 can represent accuracy as a tuple containing (60% precision, 70% recall).

To determine the output label associated with a machine learning model, the testing module 180 provides various input data to the machine learning model, and determines an accuracy of various output labels that the machine learning model produces. For example, the testing module provides various videos containing animals to the machine learning model, and requests the machine learning model to identify various output labels such as "cat", "dog", "animal", "mammal", etc. The machine learning model identifies "cat" 50% of the time, "dog" 60% of the time, "mammal" 30% of the time, and "animal" 70% of the time. The testing module 180 determines that the output label with the highest accuracy is "animal," and associates the output label "animal" with the machine learning model.

Figure 2:
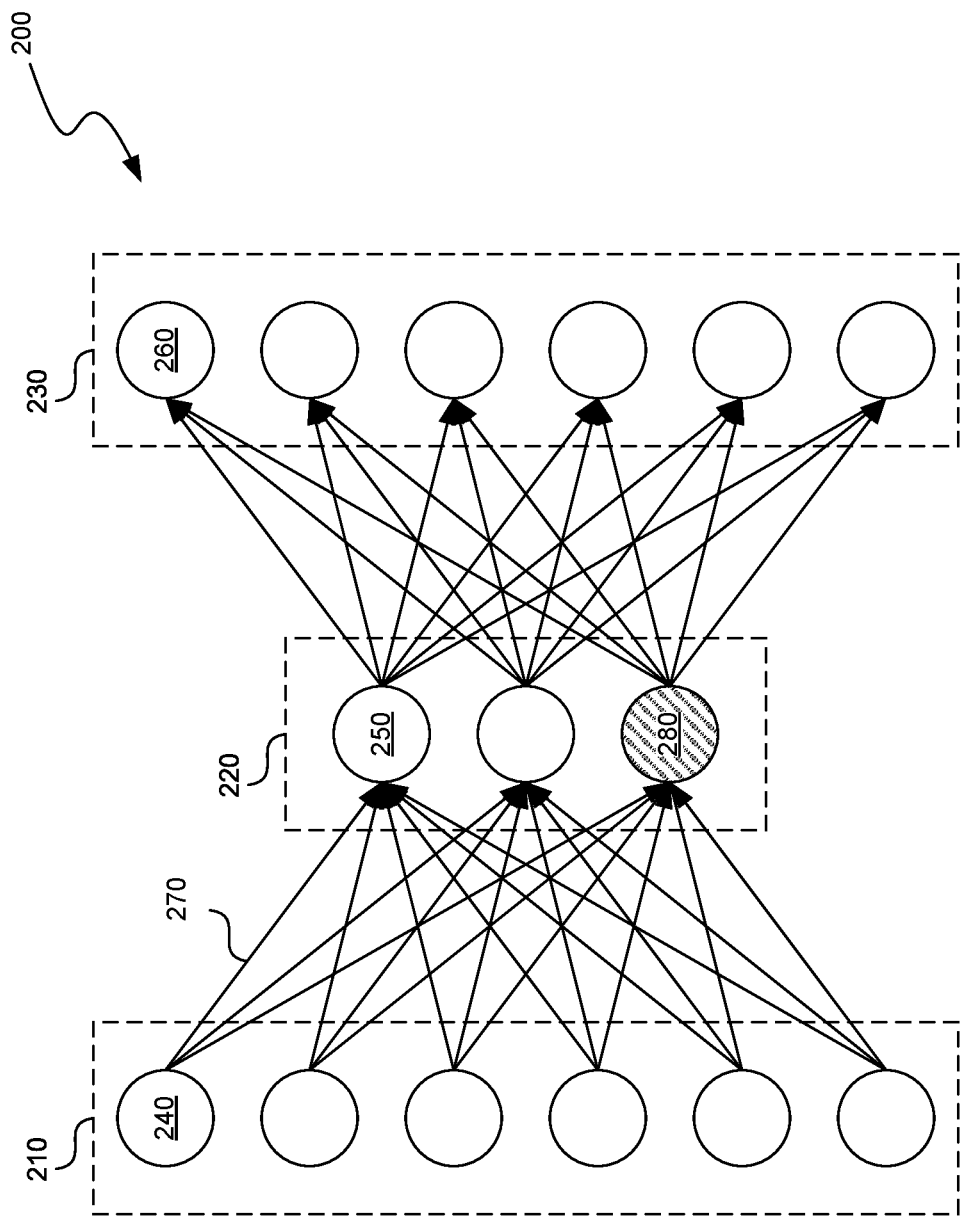
FIG. 2 is an example of a machine learning model, according to one embodiment.

FIG. 2 is an example of a machine learning model, according to one embodiment. The machine learning model is an artificial neural network 200 ("neural network"), receiving input data at the input layer 210, processing the input through various layers 210, 220, 230, and outputting an output label at the output layer 230. The neural network 200 can contain multiple layers in addition to the layer 220, between the input layer 210, and the output layer 230.

Each layer 210, 220, 230 includes one or more neurons, such as a neuron 240 in the input layer 210, a neuron 250 in the layer 220, a neuron 260 in the output layer 230. The number of neurons among the layers can be the same, or can differ. Each neuron in the layer 210, 220 can be connected to each neuron in the subsequent layer 220, 230, respectively. Alternatively, each neuron in the layer 210, 220 can be connected to a subset of neurons in the subsequent layer 220, 230, respectively. Neurons are connected via connections 270 (only one labeled for brevity), where each connection includes a weight, where weight is a scalar number.

The input layer 210 receives the input data, such as video, audio, alphanumeric text, etc. For example, the neuron 240 receives a group of one or more pixels from the input data. The input data is processed through the layers 210, 220, 230, and the layer 230 outputs an output label, such as "a pedestrian." The output label can be accompanied by a confidence level associated with the output label, and/or an input data region, such as an image region, within which the neural network 200 has identified the output label. The confidence level is expressed within a normalized range, such as 0% to 100%, or 0 to 1, indicating how confident the neural network 200 is that the input data region contains the identified output label.

To improve the accuracy of the neural network 200, the testing module can train the neural network 200 with additional training data, delete redundant neurons 280, adjust the weights of the connections 270, or combine various neural networks 200 in serial, in parallel, or hierarchically to obtain a resulting neural network with improved accuracy.

The neural network 200 is defined by the number of layers, number of neurons in each layers, connectivity between neurons, and weights associated with the neural connections. For security purposes, all this information can be encrypted before the resulting machine learning model is provided to a user device.

Figure 3:
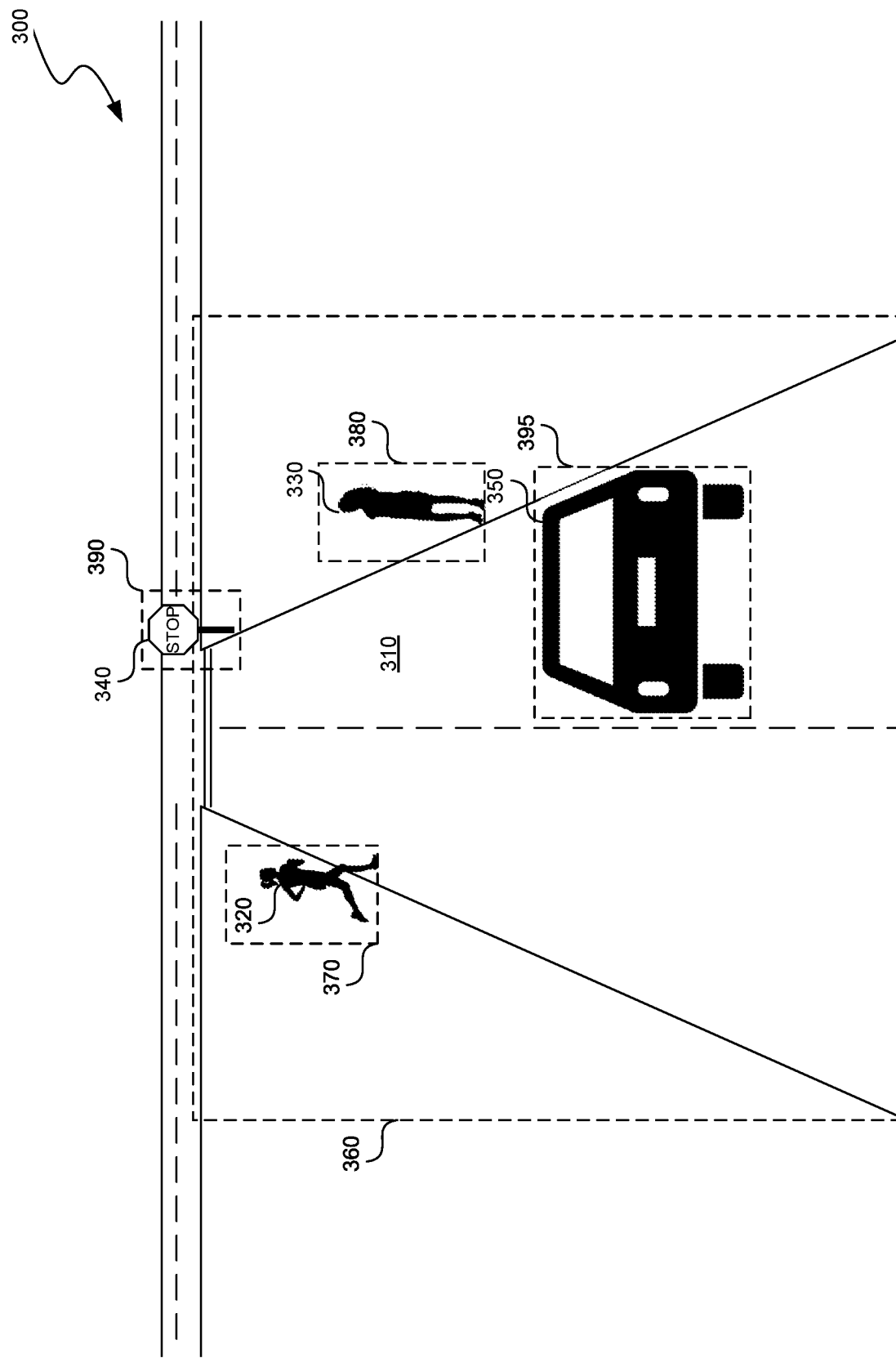
FIG. 3 shows an example input into a machine learning model.

FIG. 3 shows an example input into a machine learning model. The example input can be an image 300 recorded by a camera of a self-driving car. One or more machine learning models receive the input image and identify various objects of interest within the scene, such as "street" 310, "pedestrian" 320, 330, "stop sign" 340, "car" 350, etc. One or more machine learning models can also identify the region of the image within which each object of interest is located, such as street region 360, pedestrian region 370, 380, stop sign region 390, car region 395, etc. The region of the image 360, 370, 380, 390, 395 can be a bounding box of the identified feature in the image. In addition, one or more of machine learning models can identify a confidence level associated with each object of interest, such as 0.9 confidence level for street, 0.8 confidence level for pedestrian, 1 confidence level for stop sign, 0.85 confidence level for car. The machine learning models can be combined in parallel, in serial, hierarchically, etc., to identify each object of interest with an appropriate output label, such as "street" 310, "pedestrian" 320, 330, "stop sign" 340, "car" 350, etc. Further, after combining the existing machine learning models, the server can train each of the constituent machine learning model separately, thus reducing the memory and processor requirements needed to train the machine learning model.

Figure 4:
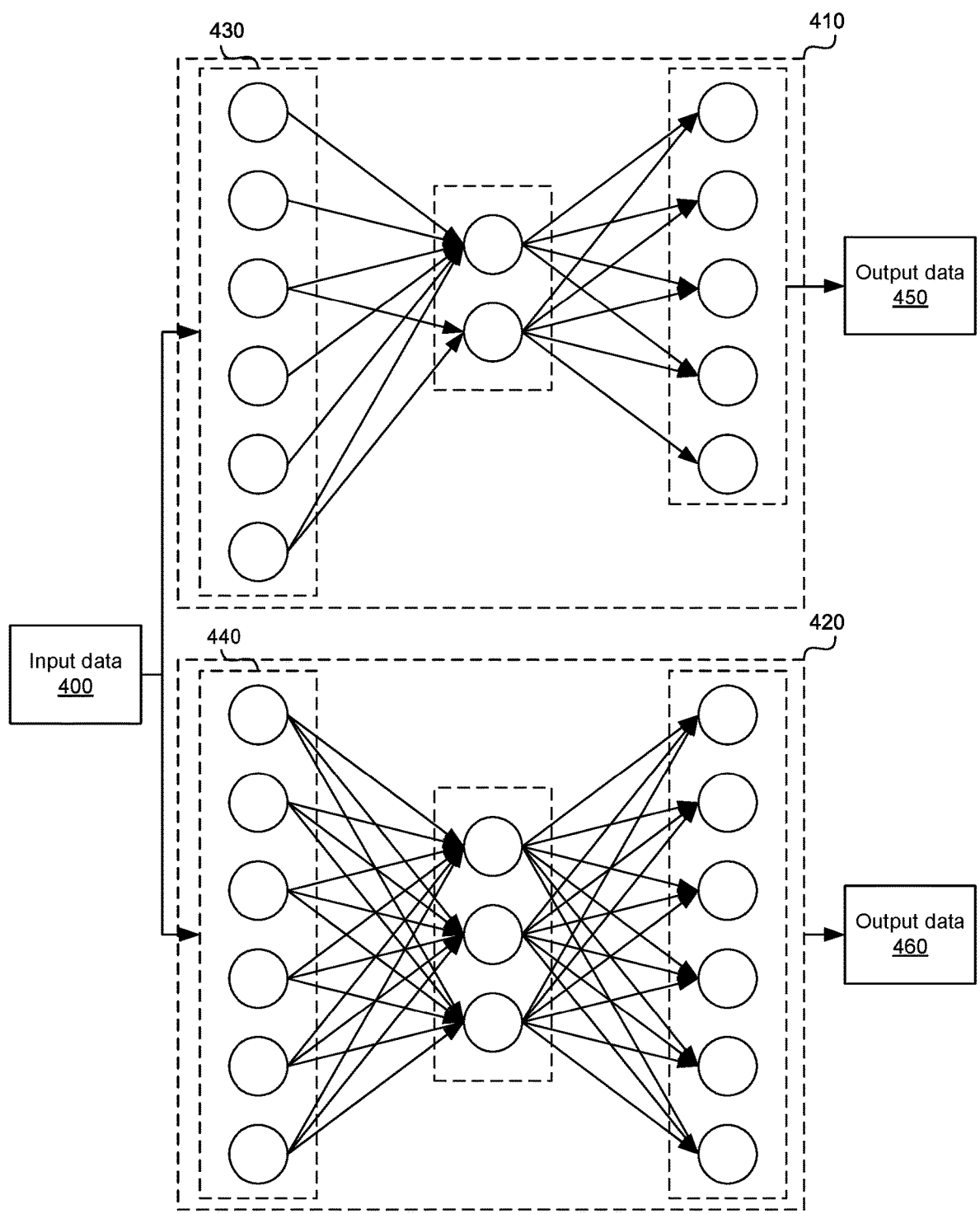
FIG. 4 shows two machine learning models combined in parallel.

FIG. 4 shows two machine learning models combined in parallel. The same input data 400 is provided to two machine learning models 410, 420. The input data 400 can be an image, video, an audio, an alphanumeric text, etc. The input layers 430, 440 of the machine learning models 410, 420, respectively, receive the input data 400, and process the input data 400 to produce two different output data 450, 460 respectively. Output data 450, 460 can be an output label such as "pedestrian", "running pedestrian", "stop sign", "foreign stop sign", etc. In addition to the output label, output data 450, 460 can also contain a region in the input data where the output label has been identified, and/or confidence level in the identified output label. Further, the output label, the region associated with the output label, and/or the confidence level, can contain multiple values, and can be organized in tuples. For example, output data 450 can contain ((output label 1, output label 2, output label 3), (region 1, region 2, region 3), (confidence level 1, confidence level 2, confidence level 3)), where output label 1 corresponds to region 1, confidence level 1, output label 2 corresponds to region 2, confidence level 2, etc.

The machine learning model 410 and the machine learning model 420 specialize in identifying different features in the input data 400. For example, the machine learning model 410 can specialize in identifying pedestrians, while machine learning model 420 can specialize in identifying pedestrians who are running. By combining the two machine learning models 410, 420, the overall accuracy of identifying pedestrians, both running and stationary, is increased. In another example, the machine learning model 410 can specialize in identifying Americans stop signs, while machine learning model 420 can specialize in identifying European stop signs. Again, by combining the two machine learning models 410, 420, the overall accuracy of identifying stop signs is increased. The combined machine learning model 410 and the machine learning model 420 can be the resulting machine learning model provided to a user device.

Figure 5A:
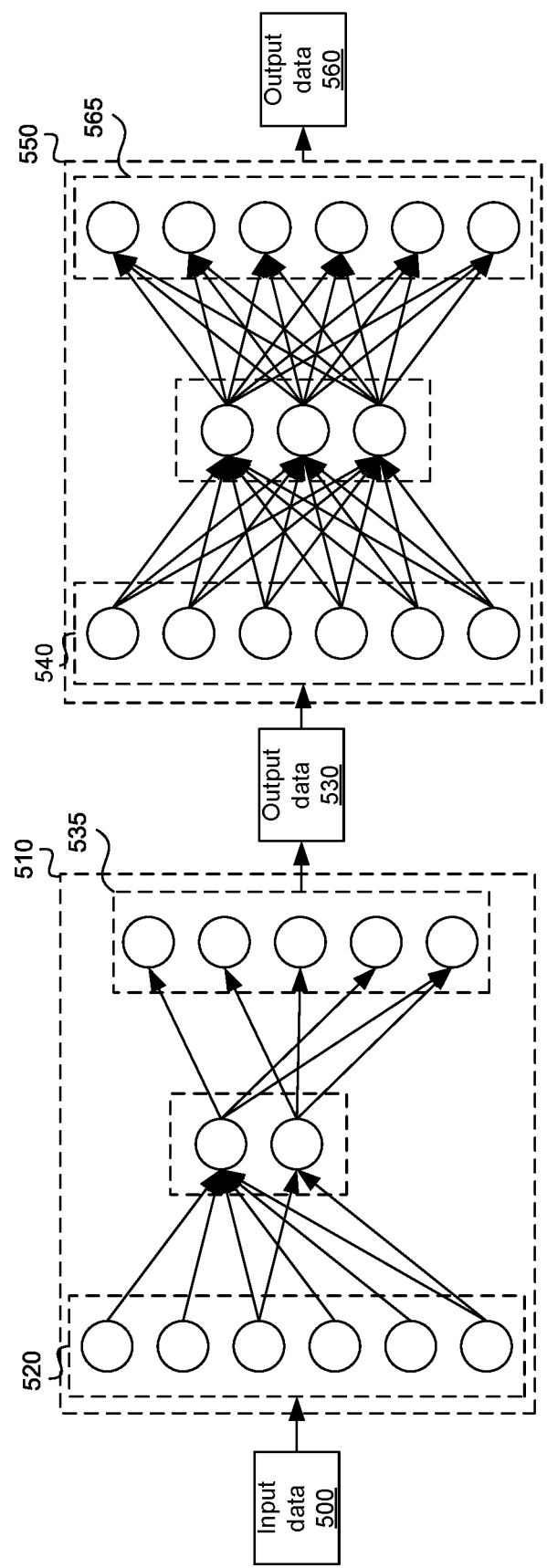
FIG. 5A shows two machine learning models serially combined.

FIG. 5A shows two machine learning models serially combined. An input data 500 is provided to an input layer 520 of a machine learning model 510. The input data 500 can be an image, a video, an audio, an alphanumeric text, etc. The input layer 520 of the machine learning model 510 receives the input data 500, and processes the input data 500 to produce an output data at 530, which can be the output layer 535 of the machine learning model 510, or can be an additional layer of output data 530 following the output layer 535, as shown in FIG. 5A. Output data 530 can be in a format such as video, image, audio, alphanumeric text, etc. Output data 530 is provided to an input layer 540 of a machine learning model 550 for further processing. Upon receiving the output data 530 as input, machine learning model 550 processes the output data 530, and produces output data 560, which can be the output layer 565, or can be an additional layer of output data 560 following the output layer 565, as shown in FIG. 5A.

The output data 530 can be provided to the input layer 540 by directly connecting the output layer 535 of the machine learning model 510 to the input layer 540 of the machine learning model 550. The neurons of the output layer 535 can be directly connected to the neurons of the input layer 540 in a one-to-one, one-to-many, many-to-one, or one-to-none mapping. Alternatively, the mapping can be one-to-none, meaning a neuron of the output layer 535 can be connected to none of the neurons of the input layer 540.

The machine learning model 510 and the machine learning model 550 specialize in identifying different features in the input data. For example, the machine learning model 510 can specialize in identifying pedestrians, while machine learning model 550 can specialize in identifying pedestrian behavior. In this example, the machine learning model 510 provides a tuple of regions and a label "pedestrian" as input to the machine learning model 550. The machine learning model 550 receives each region and the label "pedestrian", and produces the output data 530 including an output label such as "stationary", "walking", "expected to walk", "expected to run," etc. The output data 560 can include the output data 530. Thus, the output data 560 can specify two output labels such as "pedestrian", "stationary". In addition, the output data 560 can include a region associated with the output label, and a confidence level associated with the output label. As explained above, the outputs label, the output region, in the confidence level can be represented as a collection of output label tuples, output region tuples, and confidence level tuples. The machine learning model 510 and the machine learning model 550 combined can be the resulting machine learning model provided to a user device.

Figure 5B:
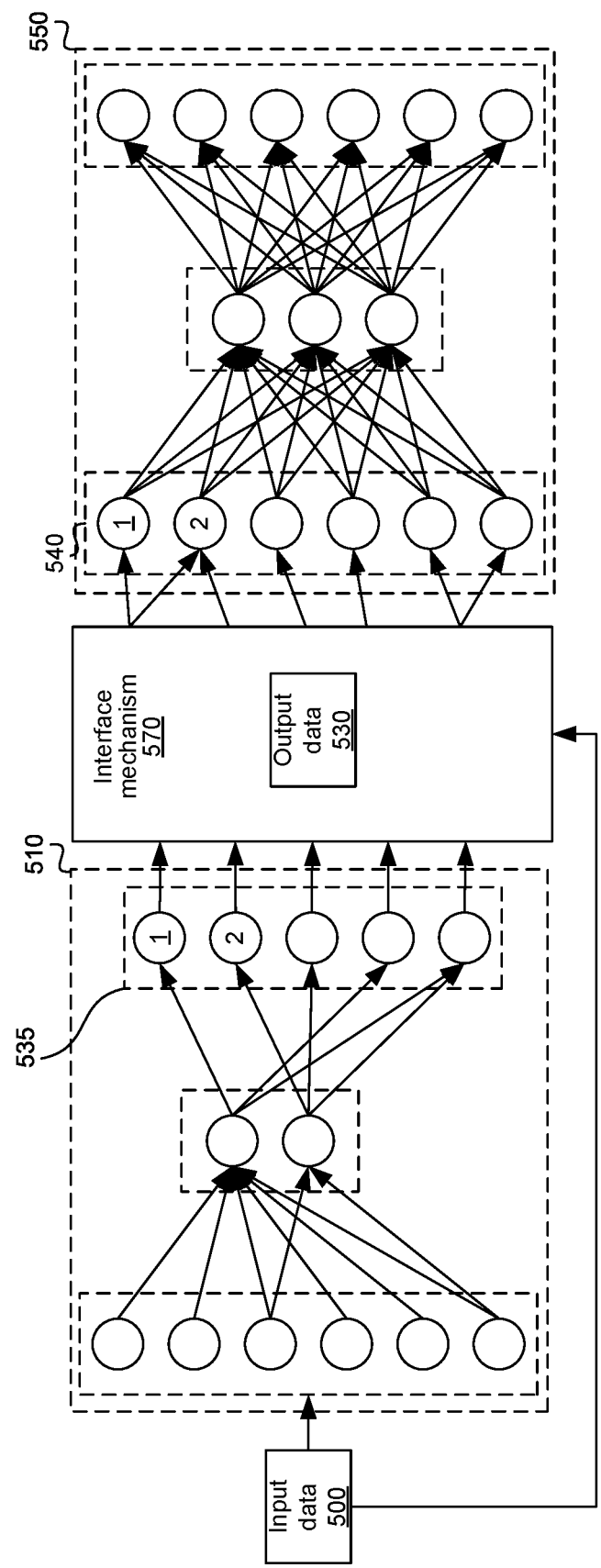
FIG. 5B shows two machine learning models serially combined using an interface mechanism.

FIG. 5B shows two machine learning models serially combined using an interface mechanism. The interface mechanism 570 can define a mapping between the output layer 535 of the machine learning model 570, and the input layer 540 of the machine learning model 550. For example, the interface mechanism 570 can map neuron 1 in the output layer 535 to neuron 1 and 2 in the input layer 540, neuron 2 in the output layer 535 to neuron 2 in the input layer 540, etc. The mapping can be one-to-one, one-to-many, many-to-one, or one-to-none. In another example, the interface mechanism 570 can receive the input data 500 to create output data 530 provided to the input layer 540. The interface mechanism 570 can segment the input data 500 into regions associated with the output labels in the output data 530, and provide each of the regions as a separate input into the machine learning model 550.

Figure 6:
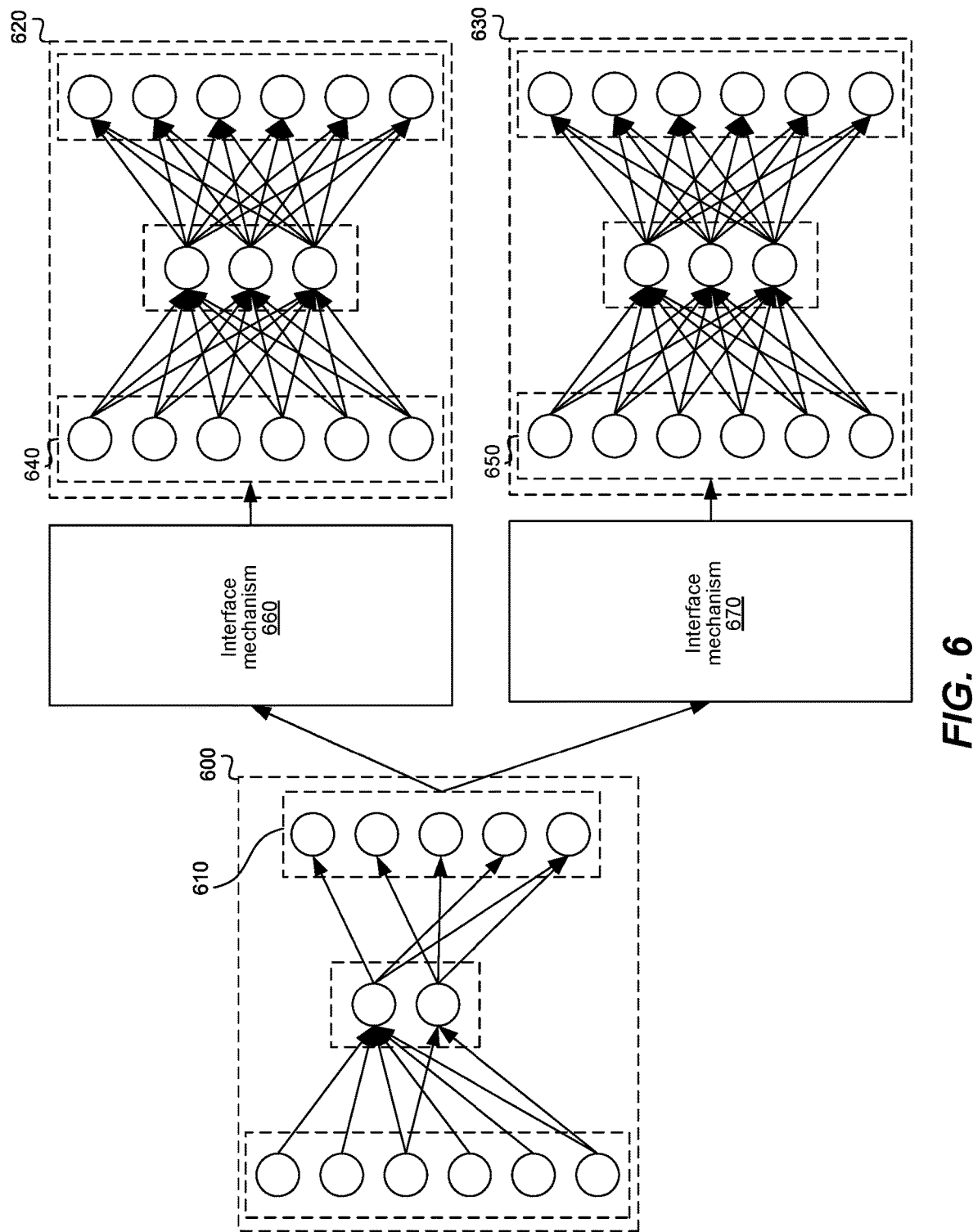
FIG. 6 shows two machine learning models hierarchically combined.

FIG. 6 shows two machine learning models hierarchically combined. An output layer 610, of a machine learning model 600 is connected to multiple machine learning models 620, 630. The output layer 610 can be connected directly to the input layer's 640, 650 of the machine learning models 620, 630 respectively, or can be connected to the input layer 640, 650 through an interface mechanism 660, 670, respectively. When the output layer 610 is directly connected to the input layer 640, 650, a neuron of the output layer 610 can be connected to a neuron in the input layers 640, 650 in a one-to-one, one-to-many, many-to-one, or one-to-none mapping.

The machine learning models 600, 620, 630 specialize in identifying different, but related, features in the input data. For example, the machine learning model 600 can identify features such as objects relevant to a self-driving car, and produce an output label "relevant object", with multiple regions within the input data where the "relevant objects" have been identified. In addition, the machine learning model 600 can produce a confidence level associated with each "relevant object" identified. Machine learning model 620 can identify a feature such as traffic signs, and produce a label "traffic sign", with a multiple regions within the input data where various traffic signs can be found. Further, the machine learning model 620 can produce a confidence level associated with each "traffic sign" identified. Machine learning model 630 can identify a feature such as pedestrians, and produce a label "pedestrian", multiple regions within the input data were various pedestrians can be found, and a confidence level associated with each "pedestrian" identified. The machine learning models 620, 630 can be further connected to multiple machine learning models further below in the machine learning model hierarchy.

Figure 7A:
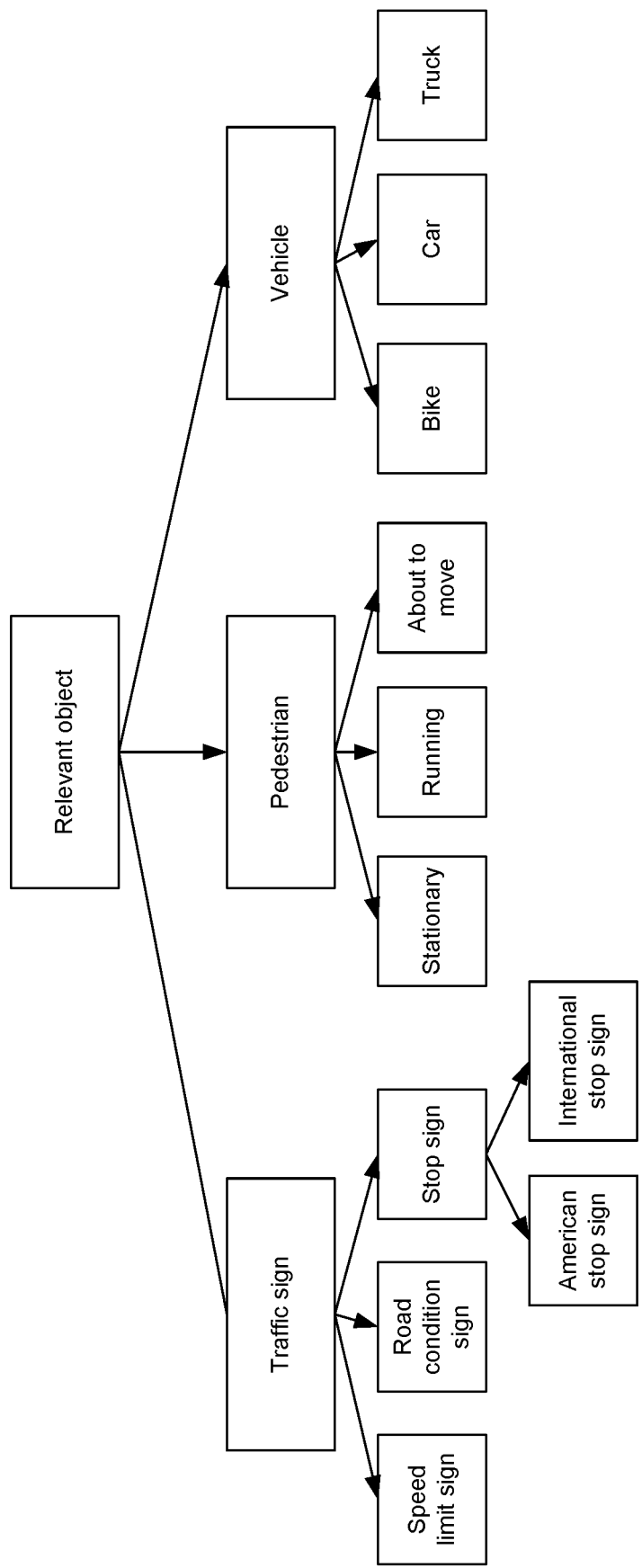
FIGS. 7A-7B shows a classification of labels, according to various embodiments.
Figure 7B:
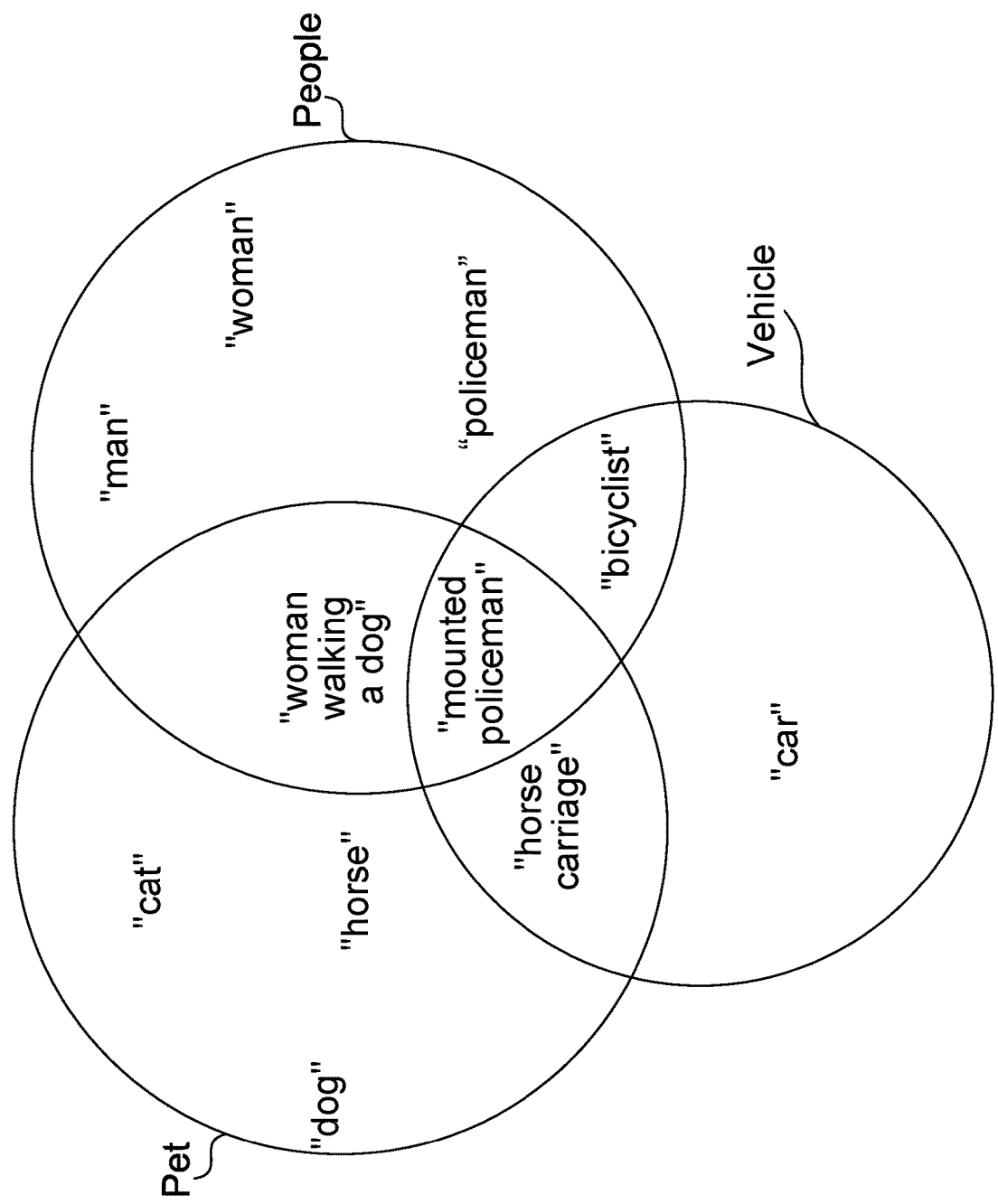

FIGS. 7A-7B shows a classification of labels, according to various embodiments. The classification of a labels can be automatically created on the server 100. The classification of labels can be performed by a label classification module implemented either in software or in hardware.

In FIG. 7A the classification of labels is hierarchical. Label "relevant object" can contain various child labels such as "traffic sign", "pedestrian", "vehicle." Each child label can contain other child labels, such as "vehicle", "bike", "car", "truck", etc. The hierarchical classification of labels can correspond to the hierarchical combination of machine learning models. That is, the machine learning model identifying "relevant objects" can have three child machine learning models identifying "traffic sign", "pedestrian", "vehicle". The machine learning model identifying "traffic sign" can have multiple machine learning models connected, where the multiple machine learning models identify various signs such as "stop sign", "speed limit sign", "road condition sign", etc.

Further, the classification can include information regarding correlation between two labels. For example, correlation 1 between labels "pedestrian" and "moving" can indicate that a pedestrian is always moving. In another example, correlation 0.1 between "relevant object" and "animal" can indicate that an animal is rarely a relevant object.

In FIG. 7B the classification of labels is based on groups. Group "pet" can contain various labels such as "cat", "dog", "horse". Group "people" can contain various labels such as "man", "woman", "policeman". Group "vehicle" can contain various labels such as "car", "horse carriage", "bicyclist". The intersection between group "pet" and "vehicle" can contain "horse carriage". The intersection between group "people" and group "vehicle" can contain "bicyclist". The intersection between group "pet" and "people" can contain "woman walking a dog". The intersection of all three groups "pets", "people", and "vehicle" can contain "mounted policeman", which includes policeman mounted on a horse or a camel.

Classification based on groups can also include strength of correlation between various groups, indicating how frequently the two groups are identified together. For example, the correlation can be measured by the number of labels in the intersection between two groups. If the number of labels and the intersection 700 between group "pet" and "people" is 50, while the total number of labels in groups "pet" and "people" is 100, the correlation between groups "pet" and "people" is 0.5.

Figure 8:
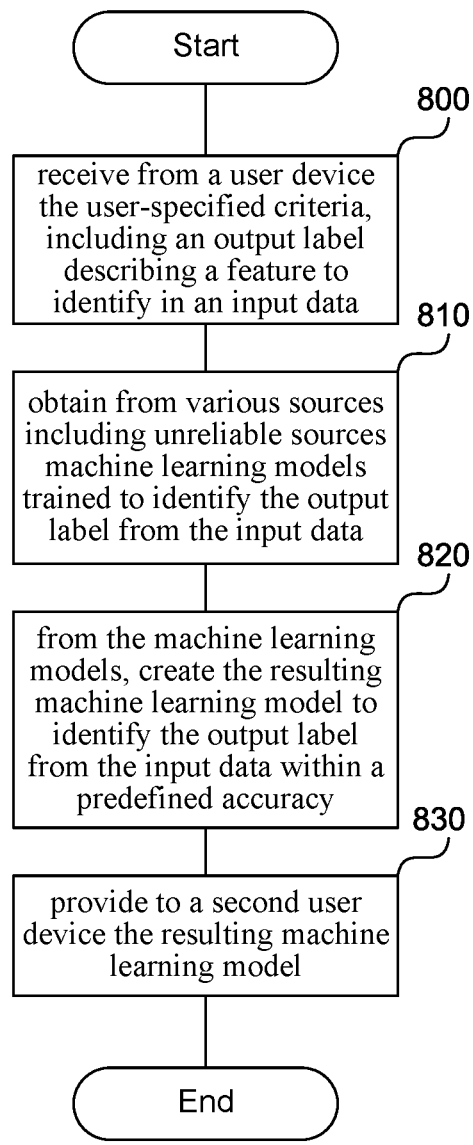
FIG. 8 is a flowchart of a method to reduce memory and processor consumption required in creating a machine learning model according to user-specified criteria.

FIG. 8 is a flowchart of a method to reduce memory and processor consumption required in creating a machine learning model according to user-specified criteria. In step 800, the server receives from a first user device the user-specified criteria, which include a label describing a feature to identify in an input data using a machine learning model, and optionally a user specified accuracy of a resulting machine learning model. The input data can be an image, a video, an audio, an alphanumeric text, etc.

The server can also receive an unknown machine learning model, determine the label that the machine learning model is trained to identify, and improve the accuracy of the machine learning model in identifying the output label. To determine the output label, the server can provide input data containing various features for various output labels to the machine learning model, and observe the accuracy, e.g. precision and recall, of a label output from the machine learning model. The server determines that the output label with the highest accuracy is the output label that the machine learning model is trained to identify. The output label with the highest accuracy can be the label that has the highest precision and the highest recall, can be the label whose total sum of precision and recall is the highest, or can be the label whose combination of precision and recall is the highest.

The combination of precision and recall can be linear, or nonlinear combination of precision and recall.

For example, the server can provide various videos containing features for various labels such as "animal", "person", "vehicle", etc. to the machine learning model. The server can then measure that: the machine learning model has precision 1/10 and recall 1/20 when identifying "animal" from input videos containing animals; the machine learning model has precision 10/15 and recall 10/22 when identifying "person" from input videos containing people; and the machine learning model has precision 2/100, and recall 2/150 when identifying "vehicle" from input videos containing vehicles. Consequently, the server determines that the machine learning model is trained to identify "person".

To improve the accuracy of the machine learning model, the server can further train the machine learning model with input data containing people, or can combine the machine learning model with other machine learning models in a serial, a parallel, a hierarchical combination, etc. Further, even after combining the existing machine learning models, the server can train each of the constituent machine learning model separately, thus reducing the memory and processor requirements needed to train the machine learning model.

In step 810, the server obtains from various sources, including at least one unreliable source, machine learning models trained to identify the output label from the input data. To obtain the machine learning models, the server can create a label classification of multiple labels, multiple machine learning models associated with the output labels, and multiple input data associated with the output labels. The label classification establishes relationships among the multiple output labels, among the multiple machine learning models associated with the output labels, and among the multiple input data associated with the labels. The server searches the label classification, to retrieve at least one of a machine learning model or an input data associated with the output labels.

In step 820, from the machine learning models trained to identify the output label from the input data, the server creates the resulting machine learning model to identify the output label from the input data within a predefined accuracy. The server can retrieve all the machine learning models associated with the output label. The server can then test the accuracy of each of the machine learning models. If none of the machine learning models identify the output label to within the predefined accuracy, the server can create the resulting machine learning model.

Creating the resulting machine learning model includes the server improving an accuracy of a machine learning model by training the machine learning model, and/or combining the machine learning model with other machine learning models. Improving the accuracy of the machine learning model can be done by providing training input data to the machine learning model until a predefined accuracy is achieved, where the predefined accuracy can be user-specified or can be automatically determined. Once the machine learning model has been modified, the machine learning model can be further trained to improve the accuracy.

For example, to automatically determine the predefined accuracy, the user can specify whether the machine learning model is going to be used in safety critical scenarios, such as a self-driving car. Based on the use of the machine learning model, the predefined accuracy can be determined from a table of predefined accuracies associated with needed safety level of the machine learning model. For example, a machine learning model used in a self-driving car can have an accuracy of (precision=0.9, recall=1), while machine learning model used in a self-driving toy car can have accuracy of (precision=0.4, recall=0.7).

In step 830, the server provides to the second user device the resulting machine learning model. The first user device can be the same as the second user device. In some embodiments, the server can encrypt the resulting machine learning model before sending the resulting machine learning model to the user. The machine learning model can be defined by the number of neurons, the connectivity among the neurons, and the weights associated with the neuron connections. The server encrypts all the information, and sends the encrypted machine learning model to the second user device, where the machine learning model operates in the encrypted form.

In creating the resulting machine learning model, in step 820, the server can create a label classification based on multiple labels and multiple machine learning models trained to identify one of the labels. The label classification can be hierarchical as shown in FIG. 7A, a grouping as shown in FIG. 7B, can be a directed graph, an acyclic graph, etc. The label classification establishes relationships among the multiple labels. The label classification can include strength of correlations between labels, as described above.

Once the server receives the label from the first user device, the server finds the label in the label classification and the machine learning model associated with the label. To find the label in the label classification, the server can search for an exact match between the received label and a label in the label classification. If no exact match has been found, the server can search for a synonym, or a meronym of the received label. Once the server finds a matching label in the label classification, the server retrieves one or more machine learning models trained to identify the matching label.

In addition to receiving the label from the user device, the server can receive a machine learning model from the user device, and determine the label associated with the machine learning model. To determine the output label associated with the received machine learning model, the server can provide various input data to the machine learning model, and determine an accuracy of various output labels that the machine learning model produces. For example, the server provides various audio files containing people talking to the machine learning model, and requests the machine learning model to identify various labels such as "woman", "man", "child", etc. The machine learning model identifies "woman" 50% of the time, "man" 60% of the time, and "child" 70% of the time. The server determines that the output label with the highest accuracy is "child," and associates the output label "child" with the machine learning model.

The server tests an accuracy of the machine learning model associated with the label either by looking up the accuracy of the associated machine learning model from memory, or by providing various input data containing the label to the machine learning model, and measuring the accuracy of the machine learning model.

When the accuracy of the machine learning model is below the predefined accuracy, the server improves the accuracy of the machine learning model by determining a problem label causing the low accuracy, and combining the machine learning model associated with the label with an additional machine learning model associated with the problem label. The problem label is an instance of the label that the machine learning model has the lowest accuracy in identifying. For example, if the machine learning model identifies "child" 70% of the time, where the machine learning model identifies "infant" 20% of the time, "boy" 70% percent of the time, and "girl" 83% of the time, the problem label is "infant". The server then finds an additional machine learning model trained to identify "infant", and combines the two machine learning models. The combination of the machine learning models can be parallel, serial, hierarchical, etc. In addition, the server can further train the combined machine learning model with additional training data to improve the combined machine model's accuracy. Further, even after combining the existing machine learning models, the server can train each of the constituent machine learning model separately, thus reducing the memory and processor requirements needed to train the machine learning model.

The server again tests the accuracy of the combined machine learning models to determine whether the accuracy is below the predefined accuracy. If the accuracy is still below the predefined accuracy, the server performs the steps outlined above to improve the accuracy of the machine learning model.

In creating the resulting machine learning model, in step 820, the server creates a label classification, as described above. Upon receiving the label from the first user device, the server finds the label in the label classification, a machine learning model trained to identify the label, a related label, and a machine learning model trained to identify the related label. The related label can be the problem label, that is, an instance of the received label that the machine learning model has the lowest accuracy in identifying. The related label can be a label that is highly correlated with the received label. For example, when the received label is "horse", the related label can be "rider".

The server then combines the machine learning model associated with the label and the machine learning model associated with the related label to obtain the resulting machine learning model. The combination can be done in serial, in parallel, hierarchically, etc. In addition, the server can further train the combined machine learning model with additional training data to improve the combined machine model's accuracy. Further, even after combining the existing machine learning models, the server can train each of the constituent machine learning model separately, thus reducing the memory and processor requirements needed to train the machine learning model.

To combine two machine learning models in serial, the server determines an initial machine learning model in the serial combination, and a subsequent machine learning model in the serial combination. The server creates an interface mechanism such that an input of the interface mechanism connects to an output of the initial machine learning model, and an output of the interface mechanism connects to an input of the subsequent machine learning model, as described above.

The server can also train two or more machine learning models to identify the same label. For example, the server can train a first machine learning model with K layers and N neurons per layer, and a second machine learning model with K*2 layers and N*2 neurons per layer to identify the label, and to produce a first confidence level and second confidence level associated with the identified label, respectively. The second machine learning model is more accurate, but the first machine learning model is smaller and cheaper. The confidence level measures how confident the machine learning model is in the label that is produced. The confidence level can be measured as a relative distance from highest confidence to an average confidence.

The server then provides new input data to the first machine learning model. The first machine learning model makes an inference about the label in the new input data and a confidence level associated with the inference. When the confidence level from the first machine learning model is below a confidence level threshold, the server provides the new input data to the second machine learning model. The confidence level threshold can be 50%.

The server can rank the correlation of confidence level to accuracy of a machine learning model, that way the server gets a measure of how well confidence level is correlated to accuracy, and use machine learning models where confidence level is highly correlated to accuracy.

The server can also detect when a machine learning model poses a security risk. The server can inspect the obtained machine learning models by identifying an overfitted machine learning model. An overfitted machine learning model has significantly more neurons than necessary to get the accuracy that the overfitted machine learning model is getting. For example, a machine learning model trained to identify "man" from an input video has accuracy of 60%, and 1 billion neurons. Other machine learning models trained to identify "man" from an input video, which have accuracy of 60%, have 1 million. Machine learning model having 1 billion neurons is overfitted, and maybe trained to identify a particular person of interest from the input video, such as the president. The server tags the machine learning model having 1 billion neurons as a security breach. The tag machine learning model is not provided to other users, and is not included in any resulting machine learning model.

Figure 9:
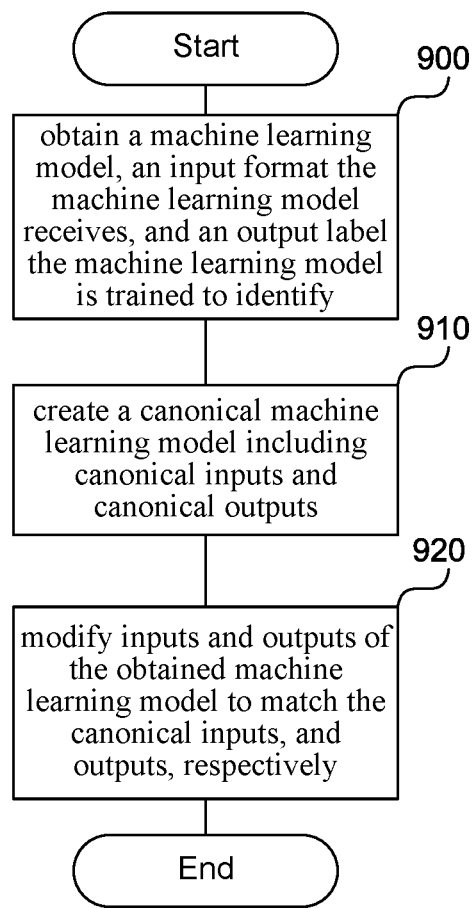
FIG. 9 is a flowchart of a method to reduce memory and processor consumption required in creating a machine learning model according to user-specified criteria.

FIG. 9 is a flowchart of a method to reduce memory and processor consumption required in creating a machine learning model according to user-specified criteria. The method can build a model to automatically identify which canonical inputs or canonical outputs another model is using. This method can enable indexing and therefore more efficient searching of machine learning models based on the inputs and outputs they produce. In step 900, the server obtains from multiple sources a machine learning model, an input format the machine learning model receives, and an output label the machine learning model is trained to identify. The input format can be "video", "image", "audio", "alphanumeric text", etc. The output label is as described in the application.

Upon receiving the machine learning model, the server can identify the input format and the output label associated with the machine learning model. The server can do this by providing various input formats, and measuring the accuracy of various output labels produced from the input formats. The server can then select an input format and an output label pair, such that given the input format the machine learning model produces the output label with an accuracy higher than accuracy of any other output label given any other input format.

In step 910, based on multiple machine learning models received, the input format and the output label, the server creates a canonical machine learning model including canonical inputs and canonical outputs. The canonical inputs receive the input format, and the canonical outputs identify the output label. To create the canonical machine learning model, the server can identify a minimal number of inputs and a minimal number of outputs, such that the canonical machine learning model upon receiving the input format, identifies the output label.

In step 920 based on the canonical machine learning model and the obtained machine learning model, the server modifies the inputs of the obtained machine learning model to match the canonical inputs, and modifies the outputs of the obtained machine learning model to match the canonical outputs.

Figure 10A:
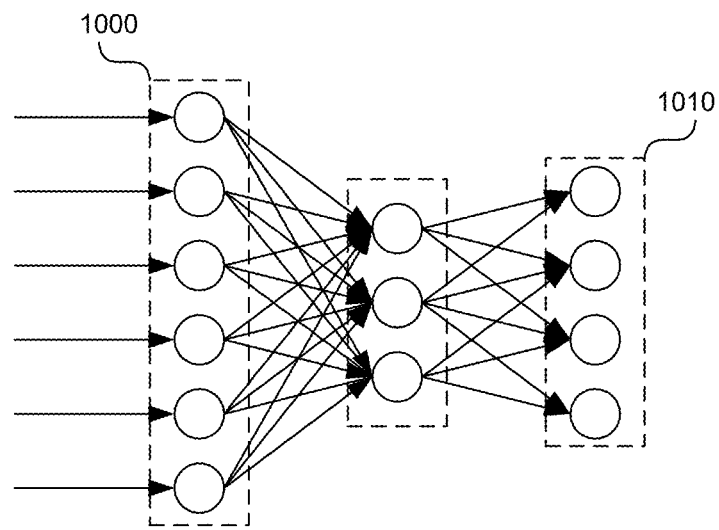
FIGS. 10A-10C show modification of the inputs and outputs of a machine learning model to match the canonical inputs and outputs, respectively.
Figure 10B:
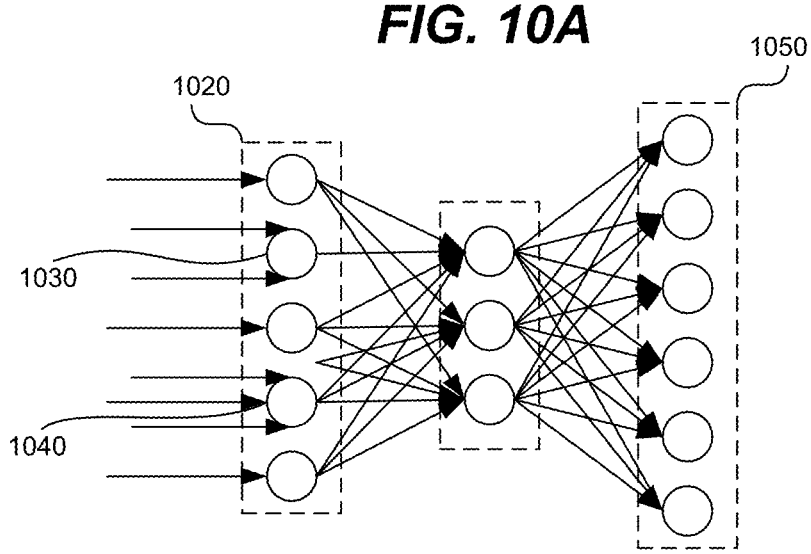
Figure 10C:
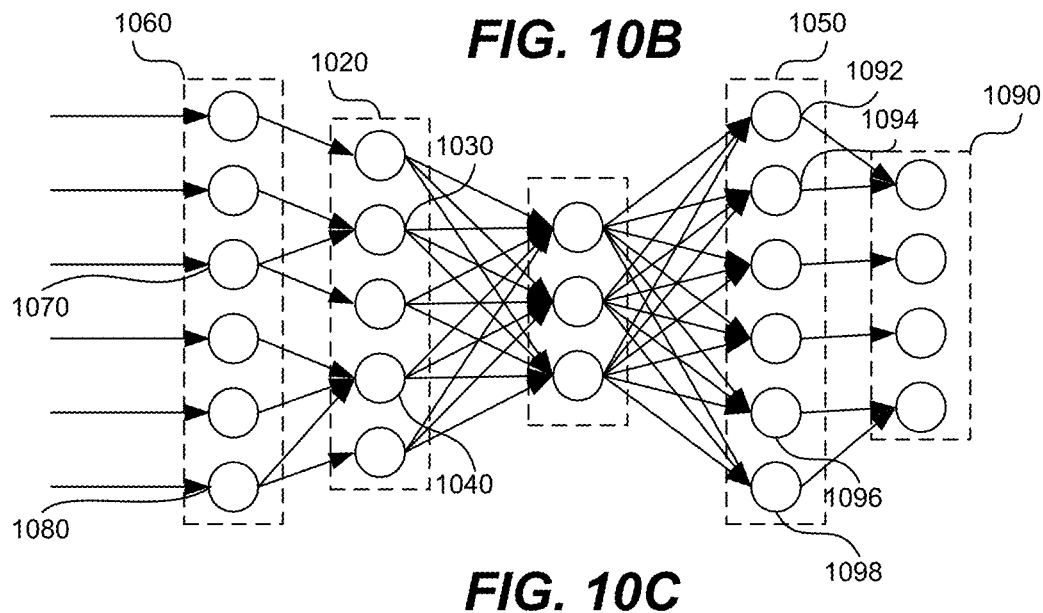

FIGS. 10A-10C show modification of the inputs and outputs of a machine learning model to match the canonical inputs and outputs, respectively. FIG. 10A shows canonical inputs, and canonical outputs of a machine learning model. The canonical inputs 1000 include six neurons, where each neuron receives one input. The canonical outputs 1010 include four neurons.

FIG. 10B shows the inputs and outputs of the obtained machine learning model. The inputs 1020 include five neurons, where neurons 1030 and 1040 receive two and three inputs, respectively, while the rest of the neurons receive one input each. The outputs 1050 include six neurons.

FIG. 10C shows an input interface layer, and an output interface layer. The input interface layer 1060 matches the canonical inputs 1000 in FIG. 10A because the input interface layer 1060 has six neurons, where each neuron receives one input. The input interface layer 1060 maps the canonical inputs to the inputs of the obtained machine learning model. The mapping can be one-to-many, many-to-one, one-to-none. In FIG. 10C, the input interface layer 1060 utilizes one-to-many mapping to map neurons 1070, 1080, which both received one input, to two neurons in the layer 1020. As a result, neurons 1030, 1040 receive two and three inputs respectively. The input interface layer 1060 can internally have one or more layers of neurons.

An output interface layer 1090 matches the canonical outputs 1010 in FIG. 10A because the output interface layer 1090 has four neurons, just like the canonical outputs 1010. The output interface layer 1090 maps the outputs 1050 to the canonical outputs. The mapping can be one-to-many, many-to-one, one-to-none. In FIG. 10C, the output interface layer 1090 utilizes many-to-one mapping to map neurons 1092, 1094, in the outputs layer 1050 to one neuron in the output interface layer 1090, and similarly to map neurons 1096, 1098 in the output layer 1050 to one neuron in the output interface layer 1090. The output interface layer 1090 can internally have one or more layers of neurons.

Other Considerations

In one embodiment, a method to reduce memory and processor consumption required in creating a resulting machine learning model according to user-specified criteria is disclosed. The method comprises receiving from a first user device the user-specified criteria, the user-specified criteria comprising a label describing a feature to identify from input data using the resulting machine learning model; obtaining from a plurality of sources including at least one unreliable source a plurality of machine learning models trained to identify the label from the input data; based on the plurality of machine learning models trained to identify the label from the input data, creating the resulting machine learning model to identify the label from the input data within a predefined accuracy, said creating the resulting machine learning model comprising improving an accuracy of a machine learning model in the plurality of machine learning models to at least the predefined accuracy, wherein the predefined accuracy comprises at least one of a user specified accuracy or an automatically determined accuracy; and providing to a second user device the resulting machine learning model wherein the first user device can be the same as the second user device.

In one or more embodiments, creating the resulting machine learning model comprises creating a label classification based on a plurality of labels and the plurality of machine learning models trained to identify at least one label in the plurality of labels, wherein the label classification establishes relationships among the plurality of labels; upon receiving the label from the first user device, finding the label in the label classification and a first machine learning model associated with the label; testing the accuracy of the first machine learning model associated with the label, said testing the accuracy comprising obtaining the accuracy of the first machine learning model; and when the accuracy of the first machine learning model is below the predefined accuracy, improving the accuracy of the first machine learning model by determining a problem label causing the low accuracy, and combining the first machine learning model associated with the label with a second machine learning model associated with the problem label.

In one or more embodiments, creating the resulting machine learning model comprises: creating a label classification based on a plurality of labels and the plurality of machine learning models trained to identify at least one label in the plurality of labels, wherein the label classification establishes relationships among the plurality of labels; upon receiving the label from the first user device, finding the label in the label classification, a first machine learning model associated with the label, a related label, and a second machine learning model associated with the related label; and combining the first machine learning model associated with the label and the second machine learning model associated with the related label to obtain the resulting machine learning model.

In one or more embodiments, combining the first machine learning model associated with the label with the second machine learning model associated with the related label, comprises making a serial combination of the first machine learning model associated with the label and the second machine learning model associated with the related label to obtain the resulting machine learning model.

In one or more embodiments, making the serial combination comprises determining an initial machine learning model in the serial combination, and a subsequent machine learning model in the serial combination; and creating an interface mechanism such that an input of the interface mechanism connects to an output of the initial machine learning model, and an output of the interface mechanism connects to an input of the subsequent machine learning model.

In one or more embodiments, said combining the first machine learning model associated with the label with the second machine learning model associated with the related label comprises: making a parallel combination of the machine learning model associated with the label and the machine learning model associated with the related label to obtain the resulting machine learning model.

In one or more embodiments, the method comprises identifying a portion of the resulting machine model with lowest accuracy; and reducing memory and processor consumption by training only the portion of the resulting machine model.

In one or more embodiments, said obtaining from the plurality of sources including at least one unreliable source the plurality of machine learning models comprises: creating a label classification of the plurality of labels, the plurality of machine learning models trained to identify at least one label in the plurality of labels, and a plurality of input data associated with the plurality of labels, wherein the label classification establishes relationships among the plurality of labels, among the plurality of machine learning models trained to identify labels, and among the plurality of input data associated with the plurality of labels; and upon receiving the label from the first user device, searching the label classification, said searching the label classification comprising retrieving at least one of the machine learning model trained to identify the label or the input data associated with the label.

In one or more embodiments, the method comprises inspecting the plurality of machine learning models, said inspecting the plurality of machine learning models comprising identifying an overfitted machine learning model in the plurality of machine learning models; and tagging the machine learning model as a security breach, said tagging comprising excluding the machine learning model from the resulting machine learning model.

In one or more embodiments, providing to the second user device the resulting machine learning model comprises: encrypting the resulting machine learning model; and providing the encrypted resulting machine learning model to the second user device.

In one or more embodiments, the method comprises training a first machine learning model and a second machine learning model to identify the label, and to produce a first confidence level and a second confidence level associated with the identified label respectively, wherein the first machine learning model is less complex and cheaper than the second machine learning model.

In one or more embodiments, the method comprises providing a new input data to the first machine learning model; based on the input data, obtaining from the first machine learning model the label, and the first confidence level associated with the label; and when the confidence level from the first machine learning model is below a confidence level threshold, providing the new input data to the second machine learning model.

In one or more embodiments, a method to reduce memory and processor consumption required in creating a resulting machine learning model according to user-specified criteria is disclosed. The method comprises obtaining from a plurality of sources a plurality of machine learning models, an input format the machine learning model receives, and an output label the machine learning model is trained to identify; based on the plurality of machine learning models, the input format and the output label, creating a canonical machine learning model comprising canonical inputs and canonical outputs, wherein the canonical inputs receive the input format, and the canonical outputs identify the output label; and based on the canonical machine learning model, modifying inputs of a machine learning model in the plurality of machine learning models and outputs of the machine learning model to match the canonical inputs, and the canonical outputs, respectively.

In one or more embodiments, said creating the canonical machine learning model comprises identifying a minimal number of inputs and a minimal number of outputs, such that the canonical machine learning model upon receiving the input format, identifies the output label.

In one or more embodiments, said modifying inputs of the machine learning model in the plurality of machine learning models and outputs of the machine learning model, comprises: creating an input interface layer such that inputs of the input interface layer match the canonical inputs; and creating an output interface layer such that outputs of the output interface layer match the canonical outputs.

Computer

Figure 11:
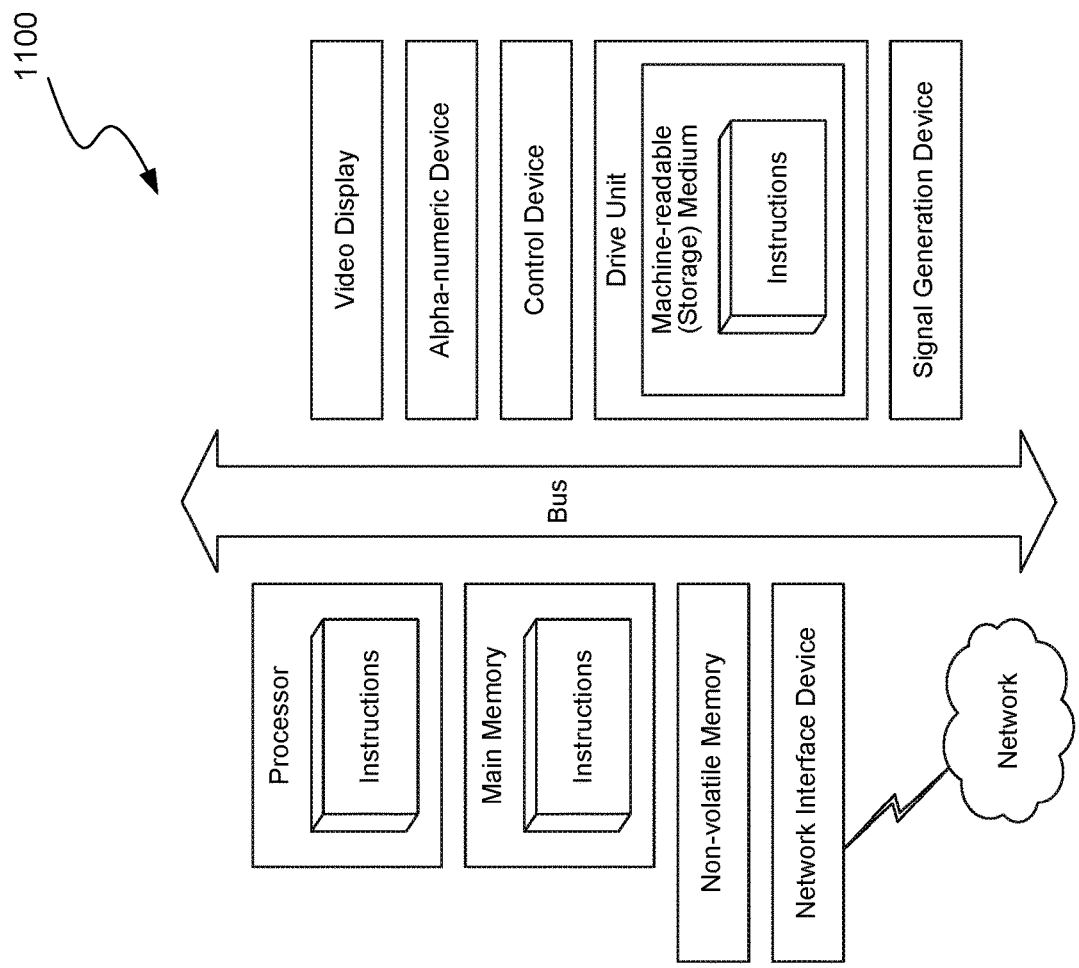
FIG. 11 is a diagrammatic representation of a machine in the example form of a computer system within which a set of instructions, for causing the machine to perform any one or more of the methodologies or modules discussed herein, may be executed.

FIG. 11 is a diagrammatic representation of a machine in the example form of a computer system 1100 within which a set of instructions, for causing the machine to perform any one or more of the methodologies or modules discussed herein, may be executed. The server 100 described in FIG. 1 can be the computer system 1100, while the communication network 1040 in FIG. 1 can be the network in FIG. 11.

In the example of FIG. 11, the computer system 1100 includes a processor, memory, non-volatile memory, and an interface device. Various common components (e.g., cache memory) are omitted for illustrative simplicity. The computer system 1100 is intended to illustrate a hardware device on which any of the components described in the example of FIGS. 1-10C (and any other components described in this specification) can be implemented. The computer system 1100 can be of any applicable known or convenient type. The components of the computer system 1100 can be coupled together via a bus or through some other known or convenient device.

This disclosure contemplates the computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1100 may include one or more computer systems 1100; be unitary or distributed; span multiple locations; span multiple machines; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1100. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1100. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 11 reside in the interface.

In operation, the computer system 1100 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method to reduce memory and processor consumption required in creating a resulting machine learning model according to user-specified criteria, the method comprising:
   receiving from a first user device the user-specified criteria, the user-specified criteria comprising a first label describing a feature to identify from input data using the resulting machine learning model;
   obtaining from a plurality of sources a plurality of machine learning models trained to identify the first label from the input data; and
   based on the plurality of machine learning models trained to identify the first label from the input data, creating the resulting machine learning model to identify the first label from the input data within a predefined accuracy, comprising:
      identifying a first machine learning model associated with the first label, wherein the first machine learning model is further associated with one or more additional labels related to the first label;
      responsive to determining that an accuracy of the first machine learning model in identifying the first label is below the predefined accuracy, identifying a related label of the one or more additional labels causing the low accuracy;
      selecting a second machine learning model from the plurality of machine learning models that is trained to identify the related label; and
      combining the first machine learning model with the second machine learning model to create the resulting machine learning model.

2. The method of claim 1, said creating the resulting machine learning model comprising:
   creating a label classification based on a plurality of labels and the plurality of machine learning models each trained to identify at least one label in the plurality of labels, wherein the label classification establishes relationships among the plurality of labels; and
   identifying the one or more additional labels associated with the first machine learning model using the label classification.

3. The method of claim 2, said combining the first machine learning model associated with the first label with the second machine learning model associated with the related label, comprises:

making a serial combination of the first machine learning model associated with the first label and the second machine learning model associated with the related label to obtain the resulting machine learning model.

4. The method of claim 3, said making the serial combination comprising:

determining an initial machine learning model in the serial combination, and a subsequent machine learning model in the serial combination; and creating an interface mechanism such that an input of the interface mechanism connects to an output of the initial machine learning model, and an output of the interface mechanism connects to an input of the subsequent machine learning model.

5. The method of claim 2, said combining the first machine learning model associated with the first label with the second machine learning model associated with the related label comprises:

making a parallel combination of the machine learning model associated with the first label and the machine learning model associated with the related label to obtain the resulting machine learning model.

6. The method of claim 2, comprising:

identifying a portion of the resulting machine model with lowest accuracy; and training only the portion of the resulting machine model.

7. The method of claim 1, said obtaining the plurality of machine learning models comprising:

creating a label classification of the plurality of labels, the plurality of machine learning models trained to identify at least one label in the plurality of labels, and a plurality of input data associated with the plurality of labels, wherein the label classification establishes relationships among the plurality of labels, among the plurality of machine learning models trained to identify labels, and among the plurality of input data associated with the plurality of labels; and upon receiving the first label from the first user device, searching the label classification by retrieving at least one of the machine learning models trained to identify the first label or the input data associated with the first label.

8. The method of claim 1, comprising:

inspecting the plurality of machine learning models, said inspecting the plurality of machine learning models comprising identifying an overfitted machine learning model in the plurality of machine learning models; and tagging the machine learning model as a security breach, said tagging comprising excluding the machine learning model from the resulting machine learning model.

9. The method of claim 1, further comprising providing to the first user device the resulting machine learning model.

10. The method of claim 1, comprising:

generating the first machine learning model by training a less complex machine learning model and a more complex machine learning model to identify the first label, and to produce a first confidence level and a second confidence level associated with the identified first label respectively.

11. The method of claim 10, comprising:

providing a new input data to the less complex machine learning model;

based on the input data, obtaining from the less complex machine learning model the first label, and the first confidence level associated with the first label; and when the confidence level from the less complex machine learning model is below a confidence level threshold, providing the new input data to the more complex machine learning model.

12. A non-transitory computer readable medium storing instructions for reducing memory and processor consumption required in creating a resulting machine learning model according to user-specified criteria, the instructions when executed by at least one processor cause the at least one processor to implement operations comprising:

receiving from a first user device the user-specified criteria, the user-specified criteria comprising a first label describing a feature to identify in input data using the resulting machine learning model;

obtaining from a plurality of sources a plurality of machine learning models trained to identify the first label from the input data; and based on the plurality of machine learning models trained to identify the first label from the input data, creating the resulting machine learning model to identify the first label from the input data within a predefined accuracy, comprising:

identifying a first machine learning model associated with the first label, wherein the first machine learning model is further associated with one or more additional labels related to the first label;

responsive to determining that an accuracy of the first machine learning model in identifying the first label is below the predefined accuracy, identifying a related label of the one or more additional labels causing the low accuracy;

selecting a second machine learning model from the plurality of machine learning models that is trained to identify the related label; and combining the first machine learning model with the second machine learning model to create the resulting machine learning model.

13. The non-transitory computer readable medium of claim 12, said creating the resulting machine learning model comprising:

creating a label classification based on a plurality of labels and the plurality of machine learning models each trained to identify at least one label in the plurality of labels, wherein the label classification establishes relationships among the plurality of labels; and identifying the one or more additional labels associated with the first machine learning model using the label classification.

14. The non-transitory computer readable medium of claim 13, said combining the first machine learning model associated with the first label with the second machine learning model associated with the related label, comprises:

making a serial combination of the first machine learning model associated with the first label and the second machine learning model associated with the related label to obtain the resulting machine learning model.

15. The non-transitory computer readable medium of claim 14, said making the serial combination comprising:

determining an initial machine learning model in the serial combination, and a subsequent machine learning model in the serial combination; and creating an interface mechanism such that an input of the interface mechanism connects to an output of the initial machine learning model, and an output of the interface mechanism connects to an input of the subsequent machine learning model.

16. The non-transitory computer readable medium of claim 13, said combining the first machine learning model associated with the first label with the second machine learning model associated with the related label comprises:
   making a parallel combination of the machine learning model associated with the first label and the machine learning model associated with the related label to obtain the resulting machine learning model.

17. The non-transitory computer readable medium of claim 13, the operations comprising:
   identifying a portion of the resulting machine model with lowest accuracy; and
   training only the portion of the resulting machine model.

18. The non-transitory computer readable medium of claim 12, said obtaining the plurality of machine learning models comprising:
   creating a label classification of the plurality of labels, the plurality of machine learning models trained to identify at least one label in the plurality of labels, and a plurality of input data associated with the plurality of labels, wherein the label classification establishes relationships among the plurality of labels, among the plurality of machine learning models trained to identify labels, and among the plurality of input data associated with the plurality of labels; and
   upon receiving the first label from the first user device, searching the label classification by retrieving at least one of the machine learning models trained to identify the first label or the input data associated with the first label.

19. The non-transitory computer readable medium of claim 12, the operations comprising:
   inspecting the plurality of machine learning models, said inspecting the plurality of machine learning models comprising identifying an overfitted machine learning model in the plurality of machine learning models; and
   tagging the machine learning model as a security breach, said tagging comprising excluding the machine learning model from the resulting machine learning model.

20. The non-transitory computer readable medium of claim 12, the operations comprising providing to the first user device the resulting machine learning model.

21. The non-transitory computer readable medium of claim 12, the operations comprising:
   generating the first machine learning model by training a less complex machine learning model and a more complex machine learning model to identify the first label, and to produce a first confidence level and a second confidence level associated with the identified first label respectively.

22. The non-transitory computer readable medium of claim 12, the operations comprising:
   providing a new input data to the less complex machine learning model;
   based on the input data, obtaining from the less complex machine learning model the first label, and the first confidence level associated with the first label; and
   when the confidence level from the less complex machine learning model is below a confidence level threshold, providing the new input data to the more complex machine learning model.

23. A method to reduce memory and processor consumption required in creating a resulting machine learning model according to user-specified criteria, the method comprising:
   obtaining from a plurality of sources a plurality of machine learning models, an input format the machine learning model receives, and an output label the machine learning model is trained to identify;
   based on the plurality of machine learning models, the input format and the output label, creating a canonical machine learning model comprising canonical inputs and canonical outputs, wherein the canonical inputs receive the input format, and the canonical outputs identify the output label; and
   based on the canonical machine learning model, modifying inputs of a machine learning model in the plurality of machine learning models and outputs of the machine learning model to match the canonical inputs, and the canonical outputs, respectively.

24. The method of claim 23, said creating the canonical machine learning model comprising:
   identifying a minimal number of inputs and a minimal number of outputs, such that the canonical machine learning model upon receiving the input format, identifies the output label.

25. The method of claim 23, said modifying inputs of the machine learning model in the plurality of machine learning models and outputs of the machine learning model, comprises:
   creating an input interface layer such that inputs of the input interface layer match the canonical inputs; and
   creating an output interface layer such that outputs of the output interface layer match the canonical outputs.

* * * * *